US011464349B2

(12) United States Patent
Vienne et al.

(10) Patent No.: US 11,464,349 B2
(45) Date of Patent: Oct. 11, 2022

(54) TRANSPORTABLE PLANTER

(71) Applicant: Zona Productions, LLC, Shreveport, LA (US)

(72) Inventors: Matt Vienne, Shreveport, LA (US); Rick Pierce, Shreveport, LA (US)

(73) Assignee: Zona Productions, LLC, Shreveport, LA (US)

( * ) Notice: Subject to any disclaimer, the term of this patent is extended or adjusted under 35 U.S.C. 154(b) by 350 days.

(21) Appl. No.: 16/473,735

(22) PCT Filed: Jun. 26, 2019

(86) PCT No.: PCT/US2019/039152
§ 371 (c)(1),
(2) Date: Jun. 26, 2019

(87) PCT Pub. No.: WO2020/006029
PCT Pub. Date: Jan. 2, 2020

(65) Prior Publication Data
US 2020/0146221 A1    May 14, 2020

Related U.S. Application Data

(60) Provisional application No. 62/689,992, filed on Jun. 26, 2018.

(51) Int. Cl.
*A01G 9/02* (2018.01)
*A47G 7/04* (2006.01)

(52) U.S. Cl.
CPC ............ *A47G 7/041* (2013.01); *A01G 9/026* (2013.01)

(58) Field of Classification Search
CPC ......... A01G 9/023; A01G 9/04; A01G 9/026; A01G 9/0295; A01G 9/0297; A47G 7/041
(Continued)

(56) References Cited

U.S. PATENT DOCUMENTS

| 936,619 | A | * | 10/1909 | Foy | ........................ A01G 9/022 |
| | | | | | 211/74 |
| 1,112,558 | A | * | 10/1914 | Red | .............................. 248/315 |

(Continued)

FOREIGN PATENT DOCUMENTS

AT          523629 B1 * 10/2021
DE   202013002569 U1 *  7/2013  ............. A01G 9/023
(Continued)

OTHER PUBLICATIONS

International Search Report and Written Opinion for corresponding PCT Application No. PCT/US19/39152 dated Dec. 23, 2019, 14 pages.
(Continued)

*Primary Examiner* — Peter M Poon
*Assistant Examiner* — Morgan T Jordan
(74) *Attorney, Agent, or Firm* — Hoffman Warnick LLC

(57) ABSTRACT

The apparatus disclosed allows a user to easily garden in a reduced area or confined space with limiting yard or space to garden. The apparatus comprises a collapsible and portable planter that allows for growth of plants upwards and downwards, the planter being collapsible for shipping and transport from one location to another, and further providing a hardware component to elevate oneself or items from a ground surface. The planter is placed upon a support frame, the support frame being collapsible into a relatively flat or two-dimensional structure easy to carry. The planter can be removably placed upon the support frame. Further, the planter and support frame together as the apparatus can be picked up and moved as desired by a user. Embodiments of the apparatus are simply designed to allow a user easy set-up, assembly, and use.

20 Claims, 6 Drawing Sheets

(58) Field of Classification Search
USPC .......................................... 47/29.6, 75, 39
See application file for complete search history.

(56) References Cited

U.S. PATENT DOCUMENTS

| | | | | |
|---|---|---|---|---|
| 1,406,893 A * | 2/1922 | Edward | ..................... | A47F 5/04 248/185.1 |
| 1,609,246 A * | 11/1926 | Hamburger | ............ | A47G 7/041 248/407 |
| 1,688,407 A * | 10/1928 | Wastak | .................. | A01G 31/06 47/14 |
| 1,830,769 A * | 11/1931 | James | ..................... | A47G 7/025 248/156 |
| D90,966 S * | 11/1933 | Bach | .............................. | D6/556 |
| D129,382 S * | 9/1941 | Reimer | ......................... | D6/405 |
| 2,520,450 A * | 8/1950 | Austin, Jr. | ............. | A47G 7/041 108/150 |
| D188,990 S * | 10/1960 | Lowe | ............................ | D6/558 |
| 3,076,289 A * | 2/1963 | Gallo | ...................... | A01G 9/12 47/83 |
| 3,169,659 A * | 2/1965 | Blackmore | .......... | B65D 21/062 206/506 |
| 3,220,603 A * | 11/1965 | Bromley | .............. | B65D 21/062 220/676 |
| 3,293,798 A * | 12/1966 | Johnson, Sr. | .......... | A01G 9/023 47/83 |
| 3,375,953 A * | 4/1968 | Miller, Jr. | ............. | B65D 21/062 206/506 |
| 3,452,475 A * | 7/1969 | Johnson, Sr. | .......... | A01G 9/023 47/82 |
| 4,001,959 A * | 1/1977 | Grendahl | ................ | A47G 7/041 D6/403 |
| 4,039,132 A * | 8/1977 | Fournier | ................ | A47G 7/041 D6/403 |
| 4,115,950 A * | 9/1978 | Lantai | ...................... | A01G 9/28 47/89 |
| 4,369,598 A * | 1/1983 | Beckwith | ............... | A01G 9/024 47/61 |
| 4,419,843 A * | 12/1983 | Johnson, Sr. | .......... | A01G 9/023 47/82 |
| 4,736,543 A * | 4/1988 | von Bertrab Erdmann ................ A01G 9/023 47/82 |
| 4,941,283 A * | 7/1990 | Armstrong | ............. | A47G 7/042 248/163.2 |
| 5,000,514 A * | 3/1991 | Hanson | .................. | A47G 7/041 297/440.13 |
| 5,136,807 A * | 8/1992 | Orlov | .................. | A01G 27/005 47/83 |
| 5,347,751 A * | 9/1994 | Carpay | .................. | A47G 7/041 47/72 |
| 5,404,672 A * | 4/1995 | Sanderson | ............. | A01G 9/023 47/39 |
| 5,438,797 A * | 8/1995 | Lendel | ................... | A01G 9/023 47/39 |
| 5,440,836 A * | 8/1995 | Lee | ........................ | A01G 31/06 47/60 |
| 5,930,951 A * | 8/1999 | Wong | .................... | A01G 9/02 47/66.1 |
| 5,932,164 A | 8/1999 | Mien | | |
| 6,092,333 A * | 7/2000 | Steffan | .................. | A01G 9/023 47/83 |
| 6,442,895 B1 * | 9/2002 | Van Roey | ............. | A01G 9/023 47/82 |
| 6,612,073 B1 * | 9/2003 | Powell | .................. | A01G 9/023 47/65.5 |
| 6,745,514 B1 * | 6/2004 | Myrland | ................ | A01G 9/026 47/84 |
| 7,168,715 B1 * | 1/2007 | Friedman | ............... | B62B 3/006 280/33.991 |
| 7,712,255 B1 * | 5/2010 | Kiessig | .................. | A01G 9/023 47/83 |
| 8,215,059 B2 * | 7/2012 | Williams | ............... | A01G 9/023 47/86 |
| 8,245,443 B1 * | 8/2012 | Caruso | .................. | A01G 9/027 47/83 |
| 8,453,379 B1 * | 6/2013 | Kumar | ..................... | A01G 9/02 47/66.6 |
| 8,635,808 B1 * | 1/2014 | Anderson | ............. | A01G 9/028 47/66.1 |
| 8,776,431 B1 * | 7/2014 | Wiseman | .............. | A47G 7/041 47/83 |
| 9,332,695 B2 * | 5/2016 | Hwang | .................. | A01G 9/022 |
| 9,521,811 B2 * | 12/2016 | Peterson | .............. | A01G 27/005 |
| 9,585,312 B1 * | 3/2017 | Klinicki | .................. | A01G 9/02 |
| 2005/0039391 A1 * | 2/2005 | Morse | .................. | A01K 63/006 47/39 |
| 2006/0005466 A1 * | 1/2006 | Atchley | ................. | A01G 9/024 47/39 |
| 2006/0070297 A1 * | 4/2006 | Palsrok | .................. | A01G 9/022 47/65.5 |
| 2009/0001035 A1 * | 1/2009 | Mulholland | .......... | A47F 7/0078 211/85.23 |
| 2010/0287834 A1 * | 11/2010 | Felknor | .................. | A01G 9/023 47/82 |
| 2011/0289837 A1 * | 12/2011 | Phillips | .................. | A01G 9/022 47/65.6 |
| 2011/0290961 A1 * | 12/2011 | Kamon, II | ............. | A47G 7/041 248/129 |
| 2012/0174481 A1 * | 7/2012 | Toro | ......................... | A01G 9/02 47/86 |
| 2014/0083003 A1 * | 3/2014 | Adams | ..................... | A47G 7/02 47/39 |
| 2014/0202078 A1 * | 7/2014 | Qiu | ........................ | A01G 9/026 47/79 |
| 2014/0305040 A1 * | 10/2014 | Hall | ...................... | A01G 9/1423 47/65.5 |
| 2015/0047258 A1 * | 2/2015 | Lewis | ..................... | A01G 9/023 47/66.6 |
| 2015/0144749 A1 | 5/2015 | Leyshon | | |
| 2015/0181814 A1 * | 7/2015 | Pence | ..................... | A01G 9/023 47/66.7 |
| 2015/0201563 A1 * | 7/2015 | Chiang | .................. | A47G 7/041 47/86 |
| 2017/0273253 A1 * | 9/2017 | Yeh | ........................ | A01G 9/026 |
| 2017/0273254 A1 * | 9/2017 | Ito | .......................... | A01G 9/023 |
| 2017/0318752 A1 * | 11/2017 | Pence | ..................... | A01G 9/023 |
| 2017/0354096 A1 * | 12/2017 | Xing | ..................... | A01G 27/005 |
| 2018/0220606 A1 * | 8/2018 | Daniel | ..................... | A01G 9/12 |
| 2020/0146221 A1 * | 5/2020 | Vienne | ................... | A47G 7/041 |

FOREIGN PATENT DOCUMENTS

| | | | | |
|---|---|---|---|---|
| DE | 202015004782 U1 * | 7/2016 | ............. | A01G 9/023 |
| DE | 202015102950 U1 * | 9/2016 | ............. | A01G 9/023 |
| EP | 2368464 A1 * | 9/2011 | ............. | A01G 5/04 |
| EP | 3491910 A1 * | 6/2019 | ............. | A01G 9/023 |
| GB | 2435388 A * | 8/2007 | ............. | A01G 9/023 |
| KR | 100837799 B1 * | 6/2008 | ............. | A01G 9/023 |
| KR | 20090003019 U * | 3/2009 | ............. | A01G 9/023 |
| KR | 20120006418 U * | 9/2012 | | |
| KR | 101884366 B1 * | 8/2018 | | |
| NZ | 208608 A | 7/1987 | | |

OTHER PUBLICATIONS

International Preliminary Report on Patentability for corresponding PCT Application No. PCT/US19/39152 dated Dec. 23, 2019, 10 pages.

\* cited by examiner

FIG. 3A
FIG. 3B
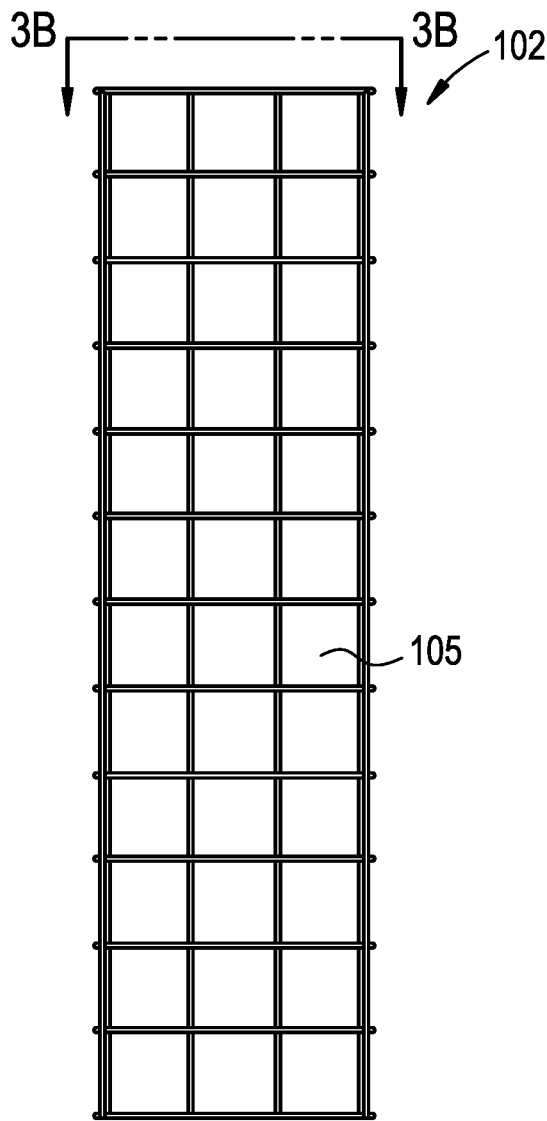
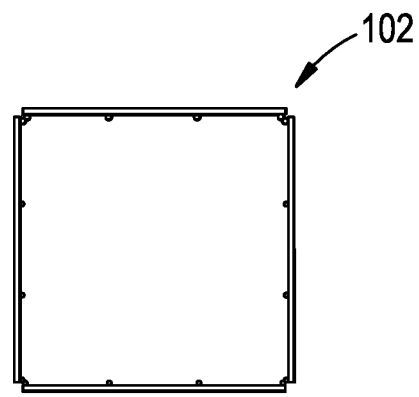
FIG. 3C
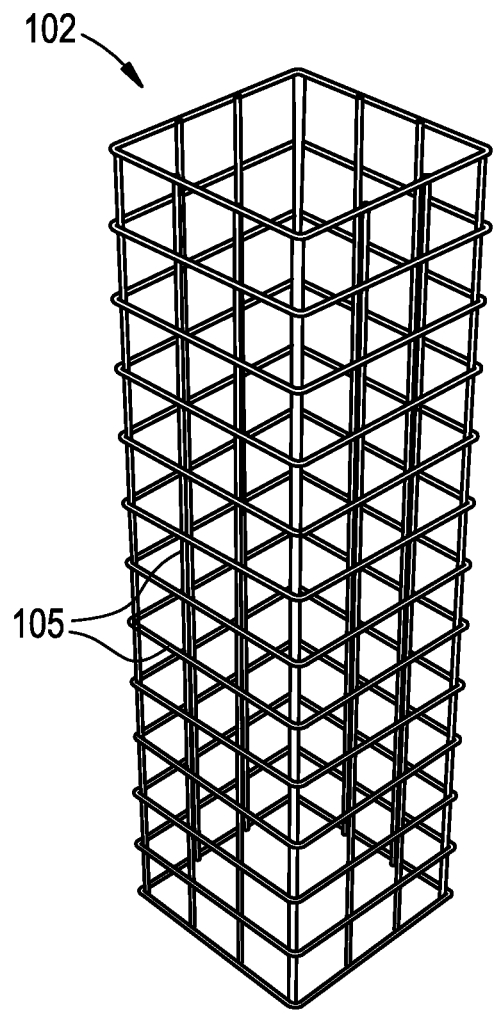

TRANSPORTABLE PLANTER

PRIORITY CLAIM

The present application claims priority to Provisional Application No. 62/689,992, filed Jun. 26, 2018, titled Transportable Planter.

FIELD OF THE INVENTION

The present invention relates generally to planter and gardening equipment, and more particularly to a transportable planter that allows for upwards and downwards plant growth.

BACKGROUND OF THE INVENTION

Current space for growing plants and vegetables in suburban and urban settings is limited, especially for apartment dwellers, renters, and owners with small or no yard space. For those who have space, planting a garden is physically demanding including plowing, digging, bending over, squatting, among other activity. With the limited space and/or demands of gardening, many people are discouraged from enjoying the rewards of growing plants, flowers, fruits, vegetables, and herbs.

Products have been designed for individual potted plants, typically for plants to grow upwards. Planters also exist to grow plants downwards, as in upside-down gardening of vegetables, herbs, and a variety of flowers too. Even where upside-down and upwards growth planters have been implemented together, the weight of the soil and/or water in combination with the plant size and growth has required stable complex structures that are often difficult if not impossible to move without removing the soil and plant components. When the volume of soil and/or planting is reduced (e.g., the growth of an herb garden), the structures that allow the plantings of herbs are individual flats or arrays of individual planters that are not modular or easily movable. The bed is typically designed for individual plantings to allow the planter to be placed on a flat surface, like a patio or near an inside window, or an apparatus may be utilized to hang or support the plantings.

The structures discussed above do not provide proper support and structure that has mobility or ease of transport from one location to another. Typically, planters for gardening in small spaces have been designed to be placed near a location that receives sunlight, from direct to indirect rays of sunlight for specific durations of time, while not designated for or capable of easy transport to and from a location of sunlight or otherwise, nor are they capable of quick assembly/disassembly without damaging the plants.

There is a need for an apparatus that improves the aesthetics and functionality of traditional pots and planters by way of a simple, easy-to-use transportable device. The transportable apparatus will have the capability to grow various types of plants in a variety of configurations. Further, the apparatus will be collapsible, easily transportable and lightweight to provide ease and convenience to the efficient urbanized gardener.

It is therefore resolved to overcome the aforementioned problems and shortcomings of the prior art that the present disclosure is embodied.

SUMMARY OF THE INVENTION

The portable, collapsible, and reusable planter assembly is an apparatus that comprises a container and cage that allows for simultaneous upwards and downwards plant growth with minimal assembly and no bending, kneeling, or stooping to care and attend to the plants. The cage and container design provides compatibility for plant choices, including vines, vegetables, herbs and/or decorative flowering plants.

The apparatus is collapsible, the portable planter having a nesting configuration to reduce height in collapsible fashion and the foldable/collapsible cage support providing an elevated platform allowing plants to grow upwards and downwards. The planter is easily transported when disassembled and easily moveable when assembled to pick up as one apparatus and move if so desired; or the planter can be moved as component parts.

A plurality of the reusable planter assemblies can be arranged in rows to imitate a garden, arranged in a yard, landscape, or outdoor lawn space. The apparatus can be picked up and moved, even when in use and fully planted to avoid potential plant damage from impending storms, unfavorable temperatures and/or late frosts. In addition, the apparatus can be easily moved to a location with better sunlight exposure to maximize plant growth.

At the end of the growing season, a user can dump out the soil, fold the cage, and un-nest the container sections for compact storage in locations such as a closet, under a bed, or any multitude of other locations given the resulting size when disassembled. The following season or growing season, a user can easily rearrange and replant. The simple design and configuration allows arrangement in a matter of minutes or even seconds.

Specifically, in one embodiment, an apparatus that is reversibly assembled and disassembled to be portable and comprises: at least a top portion having one or more tiers comprising an upper side and a lower side, the upper side having a first perimeter defined by a first set of three of more walls and the lower side having a second perimeter defined by a second set of three or more walls, wherein the upper side and the lower side form a container having at least a partial bottom surface comprising a volume of space included therein to store and bear weight of a plurality of components; and one or more base portions providing a structure to support the at least one top portion at an elevation a distance from a surface, the base portion capable of taking a reduced configuration; wherein the top portion is a collapsible configuration that is compact in storage mode and expanded when positioned with the base portion.

In one aspect, the top portion and the one or more base portions are a reversible assembly. The top portion can be expanded such that the plurality of components comprises soil, seeds, water, plants, herbs among other plant growth to be housed therein. When the top portion is compact in a configuration that is nested, stacked, flattened, folded, or reduced in another manner, the unit can be stored and more easily transported. In a reduced configuration when the base portion is nested, stacked, flattened, folded, or similarly compressed to reduce packaging size, the base portion is also portable. Nesting the top portion with the stacked or nested base portion condenses the apparatus to an easily packaged unit during shipping, storage, or other transport. In one aspect, plants are utilized with the apparatus. In various aspects, however, such as at trade shows and quick or temporary display, the apparatus may be utilized. Construct materials are used that can be decorative, transport friendly, reduced weight, weighted for greater stability, among any number of configurations.

In one embodiment, the plurality of components comprises plant growth in an upward direction and a downward direction. The gardening apparatus comprises: a support frame having at least four side panels that are collapsible; and at least one planter comprised of at least a primary frame in expanded configuration and capable of being reversibly reduced to a compact form, the primary frame having at least four side walls that form one or more trays nested inside the primary frame, the one or more trays comprising at least a partial bottom surface to contain plant growth in an upward direction and at least an opening in the at least partial bottom surface to suspend plant growth in a downward direction; wherein the primary frame further comprises a top edge structure to bear weight of the planter when placed upon the support frame; wherein the at least one planter is removably positioned upon the support frame to create a garden. The garden is reversibly assembled.

The apparatus can have a support frame comprising one or more component parts that are metal, stone, plastic, wood, or a supportive engineered material. The support frame and the at least one planter may be folded, nested, or collapsed when packaged or stored. The support frame and the at least one planter can be injection molded plastic having configurations comprising nested, folded, and stacked forms. In one embodiment, the support frame and the at least one planter are constructed as interchangeable parts of the apparatus such that the support frame and the planter can be inverted in use.

In one aspect, the support frame comprises sections that are manufactured as a first integral unit that condenses to a nested structure; and the primary frame of the at least one planter comprises a second integral unit that condenses to a second nested structure such that the second nested structure is supported in a stable configuration in combination with the support frame. The second nested structure is supported on top of the first integral unit and reversibly positioned.

A method of using an apparatus as a transportable system to garden comprises the steps of: (a) providing at least a first portion having one or more tiers comprising an upper side and a lower side, the upper side having a first perimeter defined by a first set of walls and the lower side having a second perimeter defined by a second set of walls, wherein the upper side and the lower side form a container having a volume of space included therein to store and bear weight of a plurality of components; (b) providing at least a second portion providing a structure to support the at least a first portion at an elevation a distance from a surface, the base portion capable of taking a compact configuration; (c) expanding the at least a first portion to a first position; (d) expanding the at least a second portion to a locked position; and (e) reversibly positioning the first portion with the second portion such that the volume of space forming the container extends into the second portion and supports the plurality of components as a stable construct. The plurality of components can comprise soil, seeds, water, plants, herbs, among other plant growth or inert materials.

The method of using the apparatus also includes a step of deconstructing the apparatus to a collapsed form during packaging, shipping, storage, or to later re-use. The steps of providing a first portion and a second portion may include manufacturing component parts comprising plastics, wood, metal, stone, and engineered materials. The manufacturing of component parts may include a step of injection molding or additive manufacturing.

In addition, the method of using the apparatus comprises a step of transporting the apparatus from a first location to a second location without dismantling the first portion nor the second portion. The apparatus can be moved if lightweight components are utilized. Soil and plants, however, especially when growing in an upward and downward direction are difficult to move for various reasons. Thus, the transportable planter creates a gardening system and apparatus that is portable, easy to assemble without tools, easy to disassemble without tools, and creates a visual design and configuration as desired by a user.

Various embodiments can be modified in size, shape, dimension, materials utilized, as well as adding sections to the tray, varying types of plantings, and utilizing portions of the planter volume and/or support frame network to grow more plantings, utilize fewer spaces and trays/networks, and mix/match configurations. Such modifications are apparent by one skilled in the art.

For exemplary purposes, and not limitation, embodiments herein may be circular in shape, polygonal, or otherwise. In addition, varying uses and aspects may employ supporting human weight, the weight of a child in a highchair or playseat, to an adult. Further, the apparatus can transform into a hardware piece of equipment such as a sawhorse, a ladder, a step, a stepstool, a chair, a stool, a table, a serving tray, a podium, a display, individually or in combination, among other variations.

BRIEF DESCRIPTION OF THE DRAWINGS

The accompanying drawings, which are incorporated in and constitute a part of this specification, illustrate various embodiments of the present invention, and, together with the description, serve to explain the principles of the invention. The various features are not necessarily drawn to scale. In fact, the dimensions may be arbitrarily increased or decreased for clarity of discussion. In the drawings:

FIG. 3A is a sideview of an embodiment of the apparatus.

FIG. 3B is a top view of the embodiment in FIG. 3A.

FIG. 3C is a perspective view of an embodiment of the apparatus in FIG. 3A.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts.

Figure 1A:
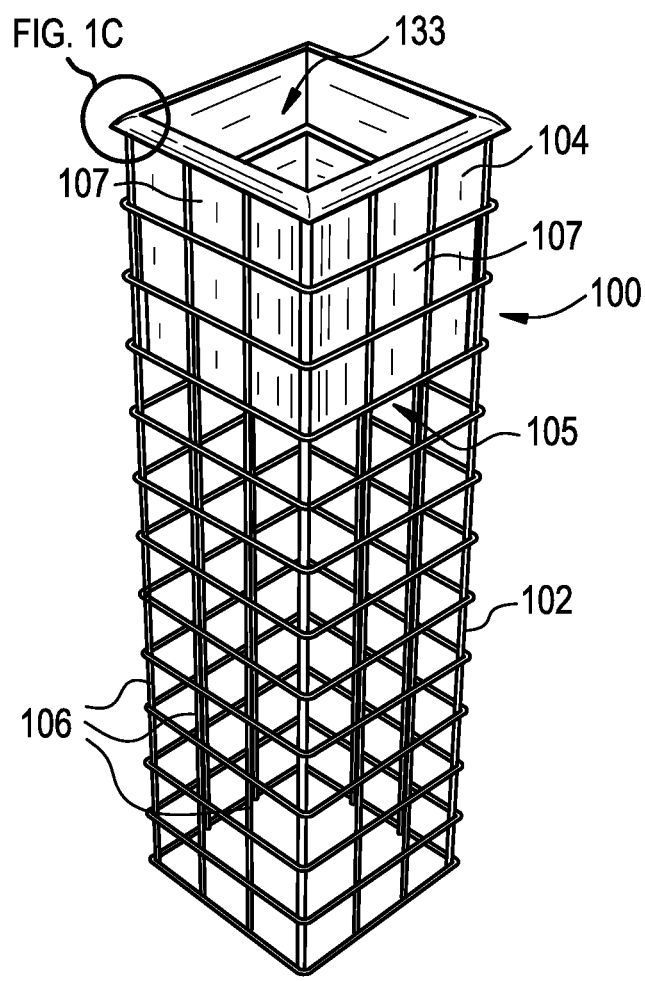
FIG. 1A is a perspective view of an embodiment of the planter.

As shown in FIG. 1A, an apparatus 100 is depicted having a support frame 102 and a nested tray 104 forming a space 133 therein capable of holding soil, water, plants, and growth via water or plants in an upward and/or downward direction. As shown in FIG. 1, the apparatus 100 comprises a support frame 102 that is a cage structure 102 comprised of metal or plastic, individually or in combination. Additionally, the cage structure may be wood, stone, or an engineered material so as to provide a support network to the nested tray 104. Here, the cage structure 102 depicted has four side panels 106. The cage structure is collapsible to fold into a flat 2-dimensional arrangement for transport when not in use. In one aspect, the metal cage can be of any size, shape, and configuration. In another aspect, the cage may take a rectangular shape as illustrated, in a size of about 12"×12" and about 48" in height. Any modification may be made, however, to accommodate lengths and widths of varying shapes and sizes, with three or more sides, and standing at any height as desired. In one aspect, the height is determined at the time of manufacture to be predetermined. In another aspect, the height may be adjustable as created by nested features in the support frame, sliding mechanism(s), compression or company configuration, and/or folding parts of the side panels 106. Another aspect includes at least two trays or planters, one assembled at a first top height, a height some distance above the ground or surface level, as illustrated in FIG. 1A and another positioned mid-way between the top of the cage support and the ground, a peripheral lip modified to fit within the middle of the cage support and support upward and downward plant growth. Therefore, at least two or more nested trays 104 could be positioned within the support frame 102.

Figure 1B:
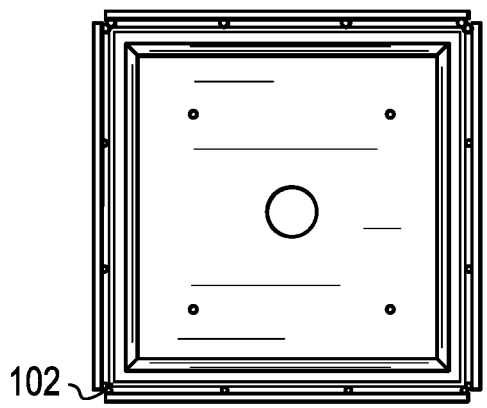
FIG. 1B is a top view of the embodiment in FIG. 1A.
Figure 1C:
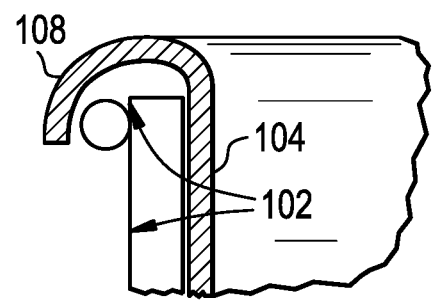
FIG. 1C is a magnified sideview of a perspective view of the embodiment in FIG. 1A where the nested tray sits within the support frame at the peripheral edge.

In one aspect, the nested tray 104 includes one or more individual trays manufactured separately. In another aspect, the nested tray 104 comprises one or more individual trays constructed as an integral unit, such as by way of injection molding, additive manufacturing, alone or in combination with other processes. A top view of the nested tray 104 is shown in FIG. 1B so as to see the various peripheral boundaries, or perimeters of the three individual units shown here that define the box-like structure that defines the nested tray 104. The nested tray may incorporate any number of individual units and/or layers to increase and decrease the depth of the individual trays or overall nested tray 104.

The nested tray 104 has four sidewalls 107 that align with the side panels 106 of the support frame 102. The sidewalls 107 shown each have an overhang or lip 108 to support the weight of the nested tray, as shown in a magnified view in FIG. 1C. A bottom surface 105 is created within the nested tray having the capability to store components such as flowers or plants that grow in an upward direction and also has an opening (See FIG. 5B) to allow downward growth as well. For exemplary purposes, and not limitation, flowers and herbs could be grown in a top planted bed and tomatoes permitted access to soil and/or water and grow in a downward direction within the support frame. With the peripheral lip 108 of the nested tray 104 distributing weight uniformly on the support frame, the bearing weight of the plant, including soil and water, is supported in a stable manner to securely place planters in walking areas, patios, inside and outside locations. While the apparatus 100 depicted stably supports itself by the uniform distribution of weight, safety measures may further entail features that ground the apparatus. For exemplary purposes, and not limitation, the support frame 102 may be staked to the earth, weighted with sandbags, decorative masses, or any additional means and methods, including, but not limited to stones, weights, supportive engineered structures or otherwise, to a ground surface to prevent the planter tipping over. As well, the support frame 102 may be constructed wider at the base and narrower or taper where the nested tray is positioned.

Figure 2A:
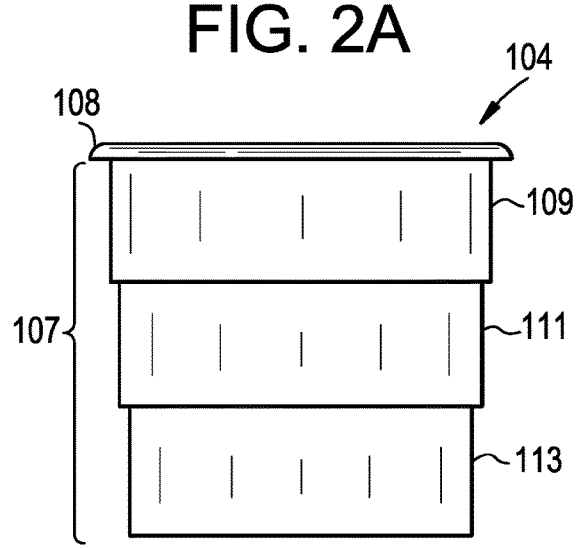
FIG. 2A is a sideview of an embodiment of a planter in an expanded configuration.
Figure 2B:
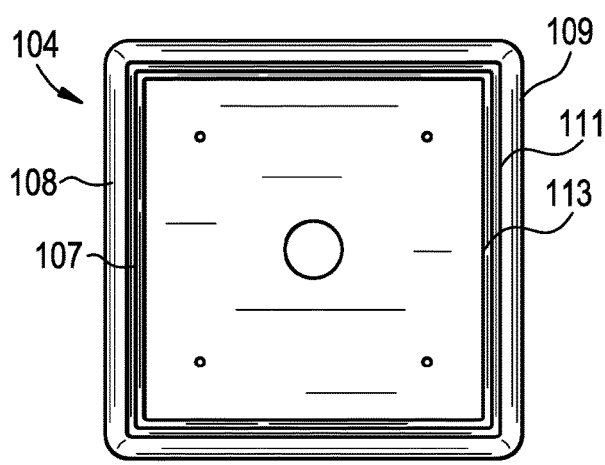
FIG. 2B is a top view of the embodiment of FIG. 2A.
Figure 2C:
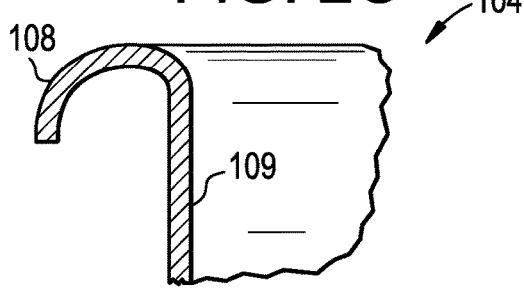
FIG. 2C is a magnified cross-section of FIG. 2A.
Figure 2D:
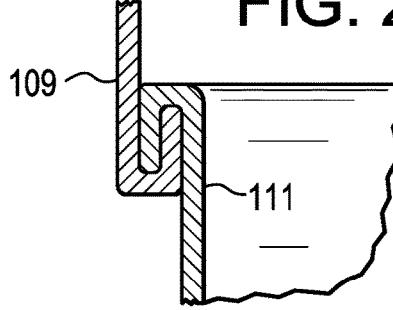
FIG. 2D is a magnified cross-section of FIG. 2A.
Figure 2E:
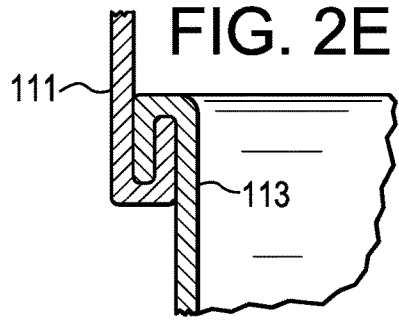
FIG. 2E is a magnified cross-view of FIG. 2A.
Figure 2F:
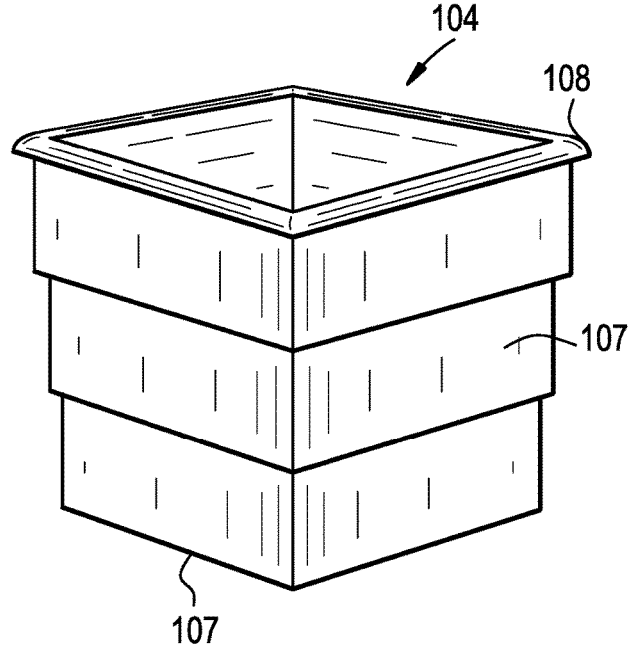
FIG. 2F is a perspective view of one embodiment.

As shown in FIG. 2A, the nested tray 104 has four integral sidewalls 107 comprised of peripheral sections of a primary frame 109, secondary frame 111, tertiary frame 113 and a peripheral lip 108. FIG. 2B is a top view of FIG. 2A such that the sidewalls 107 depict various peripheral sections of frames 109, 111, 113. FIG. 2C illustrates the primary frame integrating with the peripheral lip 108. FIGS. 2A and 2B illustrate sidewalls 107 forming a square shaped primary frame 109 of about 12⅛ inches by about 12⅛ inches at the top periphery of the apparatus 100 (in reference to FIG. 1A), a square shaped secondary frame 111 of about 11½ inches by about 11½ inches nested within the primary frame 109 (See FIG. 2D), and a square shaped tertiary frame 113 of about 10¹⁵⁄₁₆ inches by about 10¹⁵⁄₁₆ inches nested within the secondary frame 111 (See FIG. 2E). FIG. 2F shows a three dimensional perspective view of the nested tray 104 as a planter 104 expanded to a configuration of about 12"×12" at the top opening and extending downward in a locked configuration to a height of about 12 inches, including a volume of space encompassed therein with a depth from the top lip of about 12 inches. Embodiments may be structured in any number of sizes and shapes, as desired in design and functionality. The nested tray 104 flattens for transport or to a configuration easy for carry and transport. In the embodiment depicted, the nested tray 104 is reduced to a size of about 12"×12"×4". Any depth of tray and number of trays may be integrated, individually or in combination to make up a single planter, or multi-layered player, or various size and shape planters at various heights internal and external to the support frame.

FIG. 3 demonstrates the support frame 102 in various perspective views (See FIGS. 3A, 3B, 3C). Front view (FIG. 3A) depicts a matrix having a lattice structure that not only supports a planter with soil and growth upward but also the structural matrix 105 that provides a mesh network to accommodate growth of vines and plantings that may be growing downward from the tray 104 (See FIGS. 1A and 2A) or upward from a ground surface. The support cage provides for training of vines and plant growth downward to intertwine, creating a stronger plant capable of supporting itself without a stake. The structural matrix 105 is rigid enough to support the weight of the tray 104 and any components nested therein. FIG. 3C illustrates a perspective view of the support frame 102 that details an external matrix 105 of connections, wires, and otherwise. In another aspect, an internal matrix may provide greater stability and support to bear weight (not depicted). Therefore, a metal composition or plastic may be integrated for light-weight and easy transport and carry. Any materials, including carved stone, engineered materials, wood, or otherwise may be utilized as well. The aesthetic nature of the matrix and surfaces of the matrix may further comprise spray-based fertilizers for promoting growth or adherents for decorative effect. The design may be modified, sizes and shapes reconfigured as desired. The cross-sectional view at FIG. 3B illustrates the shape of one embodiment, though the apparatus may take any shape that is capable of supporting a planter or nested tray. The shape of the support frame may be of the same configuration as the nested tray, or take a different shape with any number of sidewalls.

Figure 4A:
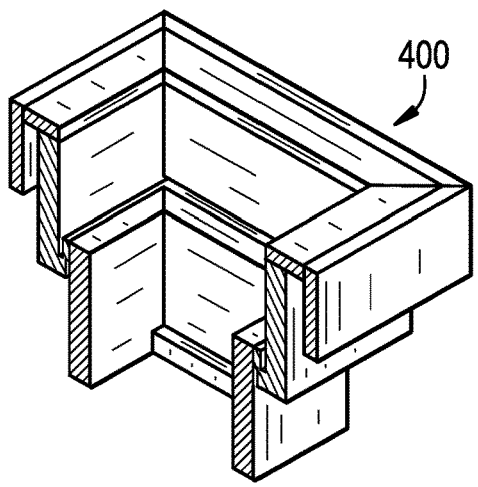
FIG. 4A-4B represent an embodiment disclosed herein.
Figure 4B:
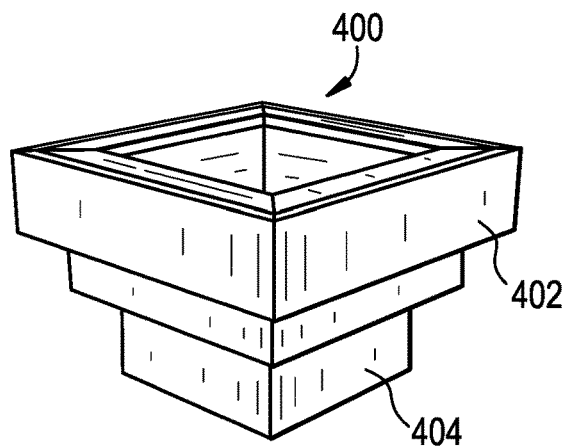
Figure 4C:
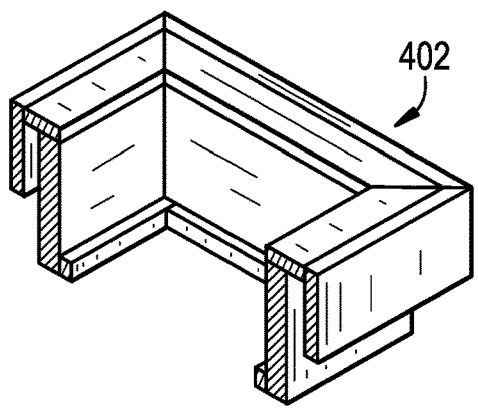
FIG. 4C, 4D are illustrations of a top portion of the embodiment of FIG. 4A-4B.
Figure 4D:
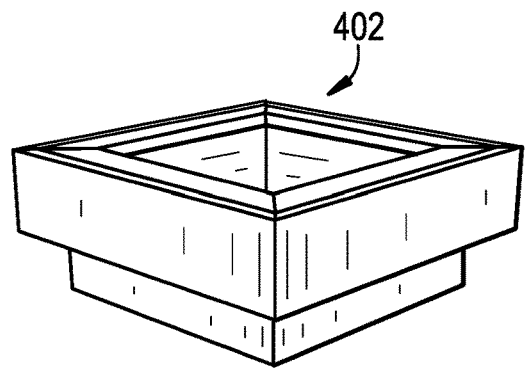
Figure 4E:
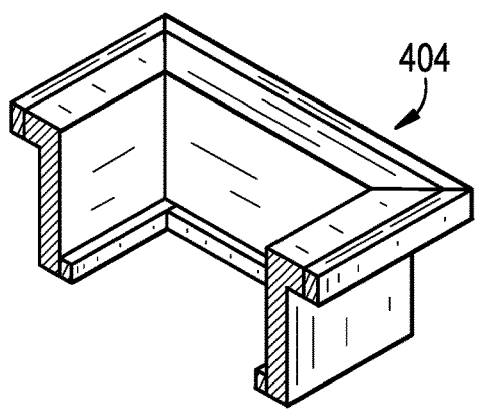
FIG. 4E, 4F are illustrations of a bottom portion of the embodiment of FIG. 4A-4B.
Figure 4F:
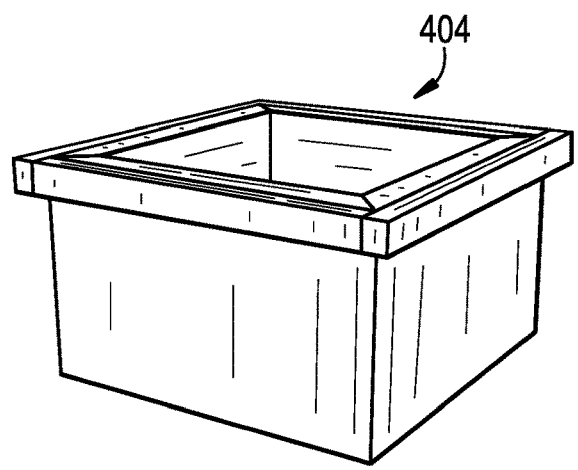

As described in FIGS. 1-3, the nested tray may be a nested box assembly comprising materials of various sorts, including but not limited to polymeric materials, ceramic, wooden, metal, or otherwise. FIGS. 4A-4F illustrate an embodiment of a cedar wood nested box assembly 400 to be utilized with the support frame 102. FIG. 4A depicts a cross-sectional perspective view of the box 400, or platform 400 while FIG. 4B depicts an assembled box 400 in full. The assembly 400 has a top portion 402 (See FIG. 4C, 4E) and a bottom portion 404 (See FIG. 4E, 4F), the assembly of which is collapsible when not in use and expandable to a sturdy weight-bearing structure capable of storing soil, plants, and various other items. In one aspect, the assembly comprises component parts including the bottom portion 404 that nests within the top portion 402 though various configurations may be assembled that do not depart from the novelty of the design. In another aspect, the design may be an expandable configuration designed as an integral tray, box, or platform that has a telescoping feature to expand in use and compress when not in use. In addition, the apparatus may be designed to have any number, shapes, and sizes of nested assemblies, including a respective support frame that is compatible (i.e., having similar shape and size, and dimensions) and accommodates the design(s) of the nested box assembly. In one aspect, the shape of the nested assembly is the same as the shape of the support frame; in another aspect, the shape of the nested assembly may differ from that of the support frame. In addition, any size, shape and dimension may be integrated including various layers, depths, number of trays, integral or individual, at one or more heights from a surface where the support frame is positioned. Octagonal, hexagonal, pentagonal shapes, as well as irregular configurations may be designed and integrated with various support frames.

Figure 5A:
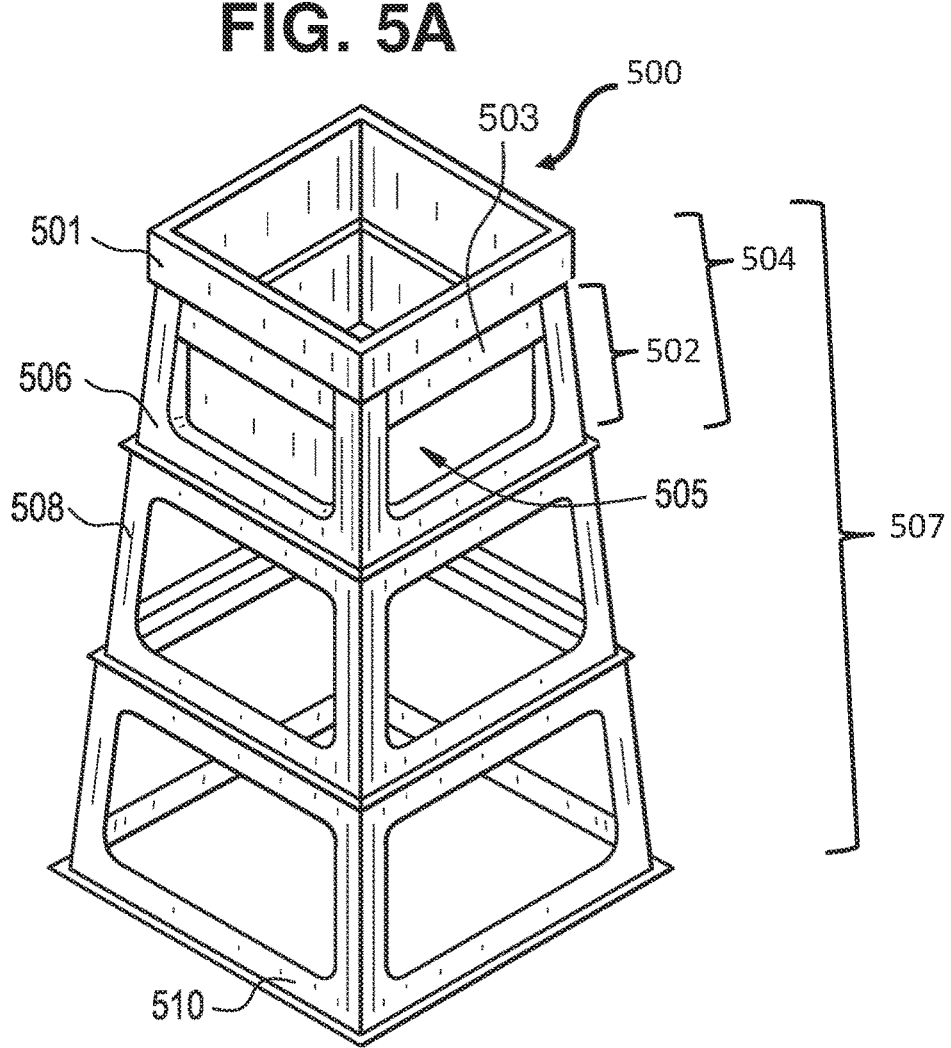
FIG. 5A is a perspective view of one embodiment of the disclosed apparatus.
Figure 5B:
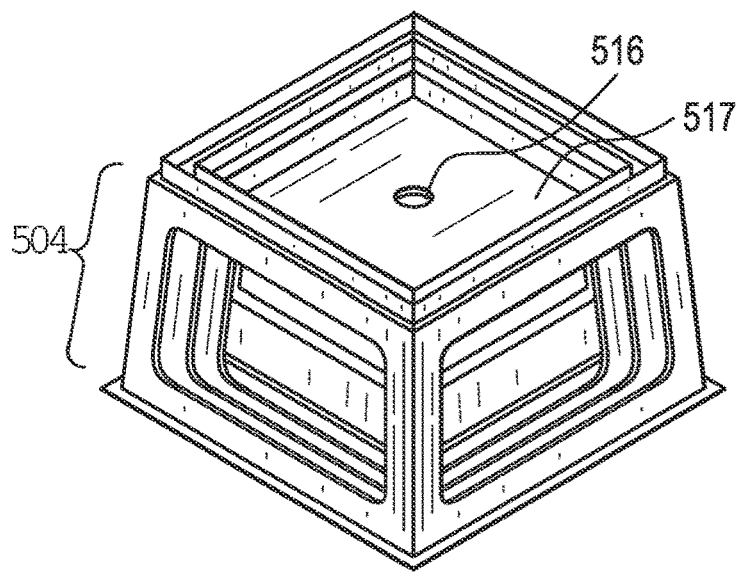
FIG. 5B is a perspective view of the embodiment of an apparatus in FIG. 5A in stacked form such that the nested box is inverted, and the tower support base is stacked in an upright order.
Figure 5C:
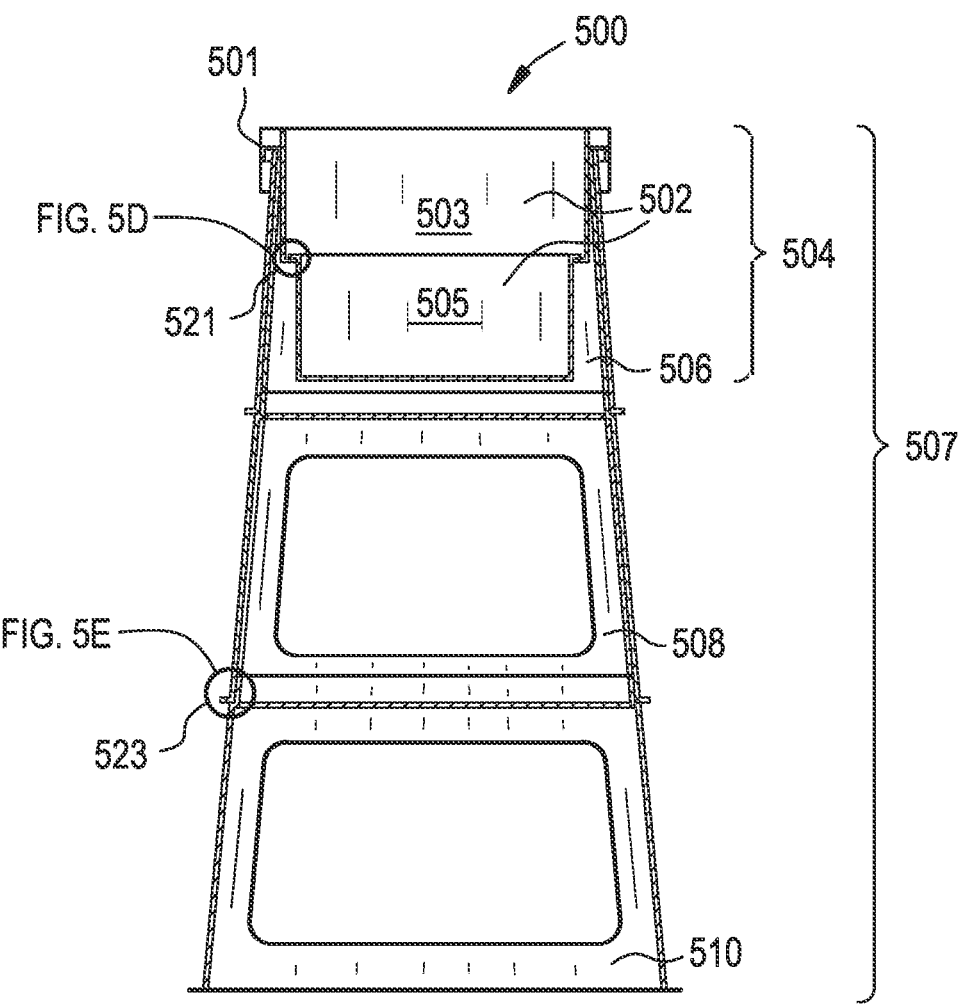
FIG. 5C is a cross-sectional view of the embodiment of FIG. 5A.
Figure 5D:
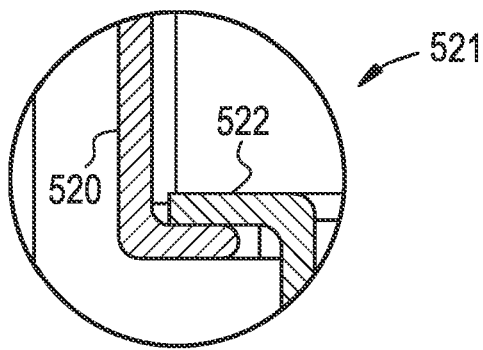
FIG. 5D is a magnified cross-sectional view from FIG. 5C.
Figure 5E:
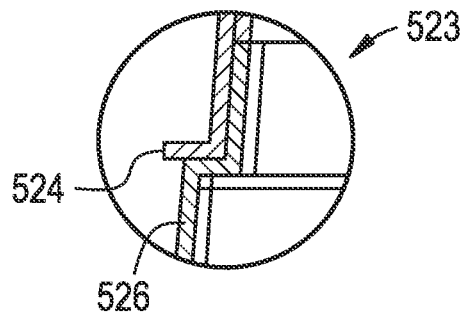
FIG. 5E is a magnified cross-sectional view from FIG. 5C.

FIG. 5A is one embodiment of a gardening apparatus 500 that comprises a planter unit 504 having sidewalls 502 including a peripheral support 501, upper section 503, and lower section 505. The planter unit 504 is positioned a distance from a surface, here, ground level, at a height determined by the dimensions of the support frame 507, here shown as a tower. As shown in FIGS. 5A and 5B, the support frame 507 comprises a primary base structure 506, a secondary base structure 508, and a tertiary base structure 510. Any number of base structures may be utilized and incorporated as desired, and also as determined by the size and depth of the planter unit 504, as well as the number of planter units that may be sized similarly or differently and positioned with the support frame 507. In addition, the planter unit has a bottom surface 517, here a partial bottom surface with an opening 516 positioned therein for downward plant growth. FIG. 5C depicts a cross-sectional view of the planter unit 504 positioned within the support frame 507, the component parts depicted as a primary base structure 506, a secondary base structure 508, and a tertiary base structure 510. Specifically, a magnified view of the planter unit 504 is shown at FIG. 5D where the surfaces form an engagement point 521. In FIG. 5D, an edge 520 of an upper section 503 of the sidewalls 502 of the planter 504 integrates with a wall 522 of the lower section 505 of the sidewalls 502. FIG. 5E depicts a ledge 524 of the secondary base structure 508 integrated with a secondary wall 526 of the tertiary base structure 510 as identified by the interface 523. As shown here, friction stabilizes the base structures when assembled on top of one another in a stable configuration. In one aspect, the connection shown in FIG. 5E may be an interlocking mechanism, magnetic mechanism, snap-in configuration, or puzzle-type male-female component parts interconnection. The base structures 506, 508, 510 here are separate stackable units though may be a nested configuration similar to the planter unit 504 that would be absent an underside. As such, in that aspect, the gardening unit could be used in a primary set-up or inverted secondary set-up. In addition, the gardening unit may serve as an elevated platform, similar to a stepstool or ladder to be used as a hardware piece of equipment.

Referring back to FIG. 5B, the apparatus 500 is depicted in a stacked configuration to ship, store, or transport the apparatus efficiently. The planter unit 502 is shown here in an inverted/upside-down position and the tower frame 507, each component 506, 508, 510 stacked in an upright order. The planter unit here is stored inside the compact ordered stacking configuration of the support frame. Here, the partial bottom surface 517 is depicted to have an opening 516 that would permit drainage and also downward plant growth into the expanded support frame 507 when in use. The partial bottom surface may take any size, dimension or shape. For exemplary purposes, and not limitation, the bottom wall may be a solid construct with a hole/opening. In one embodiment, the bottom surface is a mesh layer. In another embodiment, the bottom wall may be an extension from a wall of a lower tier or tray of the planter unit, or an extension from any individual tray of a planter unit that would also have an opening to allow downward growth, or placement of a container for hydroponically grown plants, tomatoes, among others.

In summary, the apparatus is a collapsible and portable planter that allows for growth of plants upwards and downwards. The planter can be picked up and moved as desired by a user. In addition, one or more planters can be arranged on a patio or lawn without having to plow up a yard to make a garden. The use of the planters may be seasonal and therefore can be removed from a yard and stored easily in compact form during non-use. Embodiments of the planter are simply designed to allow anyone easy set-up, assembly, and quick display.

While the focus of embodiments targets gardening, aspects herein may utilize the apparatus for growth of plantings, or for display, storage or decorative arrangement in any space and setting. As such, embodiments herein are not limited to gardening. The folding nature of the support structure and the nested collapsible configuration of the tray or planter itself allows for compact shipping, transport, and ease in relocating the planters once in use.

In one aspect, the nested trays have a locking mechanism once expanded into usable form. In another aspect, the manufacture of the trays or any part or integral component of the apparatus may be injection molded, such as an injection molded plastic process in the manufacture of the assembled setup (e.g. support matrix and planter). As well, additive manufacturing may provide one or more processes and/or compositions that are structurally advantageous in the design and makeup of the apparatus. Any number of combinations, methods of manufacture, and methods of use may be encompassed herein that do not depart from the scope of the invention.

Further, the apparatus has the potential to double or further expand crop yield and plant growth in the same amount of space by providing for simultaneous upwards and downwards plant growth. The self-support nature of the apparatus eliminates the use of any hangers from a ceiling or wall. Additionally, a user has increased accessibility whereby the apparatus keeps plants at approximate waist height, eliminating the physical demands of bending over.

Overall, the apparatus achieves the advantages of easy gardening, the benefits of upwards growth and downwards growth, while the structure is easy to move, aesthetically designed, portable, collapsible, and providing easy set-up (e.g. assembly is minimal to the extent of unpacking and arranging parts without tools). The tray(s) or plant container(s) have a nesting or collapsible nature can be constructed from materials ranging from wood, plastics, and metals, individually or in combination, as configured for design and functionality. Moreover, the cage support is constructed from three or more main panels (e.g. four panels are depicted in FIG. 1), joined to create a foldable apparatus constructed from metal grid or plastics. Both plant container and cage support are collapsible and stackable to accommodate shippers of the product, distributors in storage and inventory, and users in gardening and for display purposes. Homeowners, renters, and businesses may utilize the apparatus for decorative effect, to utilize for storage, display, and plantings that free up floor space and do not detract from a decorative space, but add contributively to a walkway, landscape, or interior design.

Any modification of information or use of the above may include any number of variables be implemented and modified to achieve the same and does not depart from the spirit and scope of the disclosed invention. Such variables may include sizes, shapes, dimensions, compositions or otherwise, not to depart from aspects of the invention.

What is claimed is:

1. A gardening system that is portable, the gardening system comprising:
    a support frame comprising a first frame structure and a second frame structure, the support frame configured to switch between an expanded configuration when in use and a compact configuration during packaging or storage; and
    a planter removably positioned in an upright direction on the support frame to create a garden when the support frame is in the expanded configuration, the planter comprising at least four side walls, a bottom surface to support plant growth in an upward direction, and an opening in the bottom surface, the opening sized to permit plant growth in a downward direction into a space within the support frame in the expanded configuration; wherein the planter further comprises a top edge structure that contacts an uppermost surface of the support frame, and wherein the first frame structure is sized to be removably stacked on the second frame structure in the expanded configuration,
    wherein when the support frame is in the compact configuration, the first frame structure is nested within the second frame structure, and the planter is nested within the first frame structure in an inverted or upside-down direction opposite to the upright direction.

2. The gardening system of claim 1, wherein the support frame comprises a metal, stone, plastic, wood, or an engineered material.

3. The gardening system of claim 1, wherein at least one of the support frame and the planter is folded, nested, or collapsed when packaged or stored.

4. The gardening system of claim 1, wherein at least one of the support frame and the planter includes injection molded plastic.

5. The gardening system of claim 1, wherein the support frame and the planter are constructed as interchangeable parts such that the support frame and the planter can be inverted in use.

6. The gardening system of claim 1, wherein the planter further comprises an upper portion and a lower portion;
    wherein the lower portion is configured to nest within the upper portion in the compact configuration; and
    wherein the lower portion further comprises a top edge structure, the top edge structure of the lower portion is configured to hang from a bottom edge structure of the upper portion in the expanded configuration.

7. The gardening system of claim 1, wherein the gardening system further comprises a base, and the support frame is positioned on the base in the expanded configuration.

8. The gardening system of claim 1, wherein the support frame further comprises a third frame structure, the third frame structure stacked with the first frame structure and the second frame structure when the support frame is in the expanded configuration.

9. The gardening system of claim 1, wherein the bottom surface of the planter supports growth of a first plant in the upward direction and the opening of the planter is sized to permit growth of a second, different plant in the downward direction.

10. The gardening system of claim 1, wherein the planter has a polygonal structure.

11. A method of using a gardening system, the method comprising:
    providing a support frame comprising a first frame structure and a second frame structure, the support frame configured to switch between an expanded configuration when in use and a compact configuration during packaging or storage;
    stacking the first frame structure on the second frame structure to arrange the support frame in the expanded configuration;
    removably positioning a planter in an upright direction on the support frame when the support frame is in the expanded configuration, the planter having at least four side walls, bottom surface to support plant growth in an upward direction, and an opening in the bottom surface, the opening sized to permit plant growth in a downward direction into a space within the support frame in the expanded configuration;
    wherein a top edge structure of the planter contacts an uppermost surface of the support frame in the expanded configuration; and
    nesting the first frame structure within the second frame structure and nesting the planter within the first frame structure in an inverted or upside-down direction opposite to the upright direction in the compact configuration.

12. The method of claim 11, the planter has a volume of space included therein to store a plurality of components comprising soil, seeds, water, plants, or herbs.

13. The method of claim 11, the method further comprising disassembling the support frame to the compact configuration during packaging or storage.

14. The method of claim 11, wherein the support frame comprises plastics, wood, metal, stone, engineered materials, or a combination thereof.

15. The method of claim 14, wherein providing the support frame further comprises manufacturing of the support frame via injection molding or additive manufacturing.

16. The method of claim 11, further comprising transporting the gardening system from a first location to a second, different location without dismantling the support frame.

17. A gardening system that is portable, the gardening system comprising:
    a support frame comprising a first frame structure and a second frame structure, the support frame configured to switch between an expanded configuration when in use and a compact configuration during packaging or storage; and a planter removably positioned in an upright direction on the support frame to create a garden when the support frame is in the expanded configuration, the planter comprising at least four side walls, a bottom surface to support plant growth in an upward direction, and an opening in the bottom surface, the opening sized to permit plant growth in a downward direction into a space within the support frame in the expanded configuration; wherein the planter further comprises a top edge structure that contacts an uppermost surface of the support frame, and wherein the first frame structure is sized to be removably stacked on the second frame structure in the expanded configuration, wherein the planter further comprises an upper portion including the top edge structure, and a lower portion releasably coupled to the upper portion, wherein peripheral sidewalls of the upper portion define a first perimeter that is greater than a second perimeter defined by peripheral sidewalls of the lower portion.

18. The gardening system of claim 17, wherein when the planter is in the expanded form, a portion of the lowermost surface of the upper portion contacts a portion of the uppermost surface of the lower portion of the planter.

19. The gardening system of claim 17, wherein the support frame comprises a metal, stone, plastic, wood, or an engineered material.

20. The gardening system of claim 17, wherein the gardening system further comprises a base, and the support frame is positioned on the base in the expanded configuration.

* * * * *